May 22, 1962
J. O. BILLUPS
3,035,535
ANCHOR LINE POSITIONING DEVICE
Filed Feb. 13, 1959
3 Sheets-Sheet 1
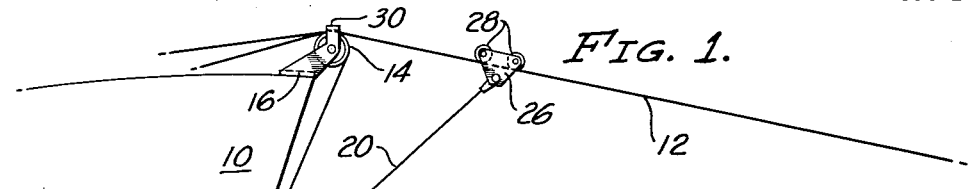
FIG. 1.
FIG. 2.
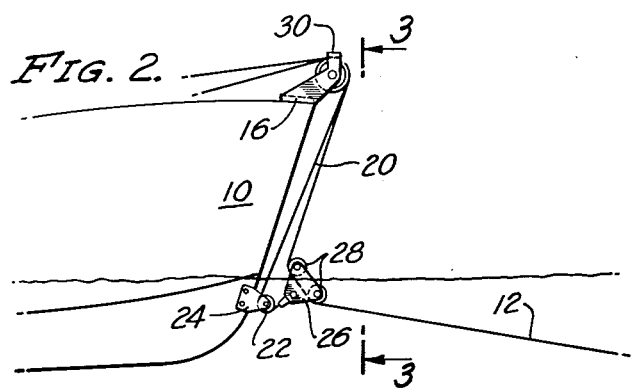
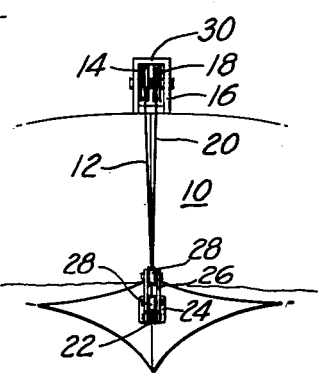
FIG. 3.
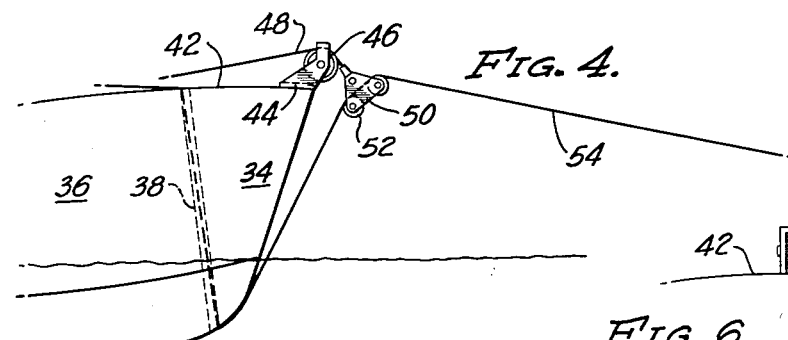
FIG. 4.
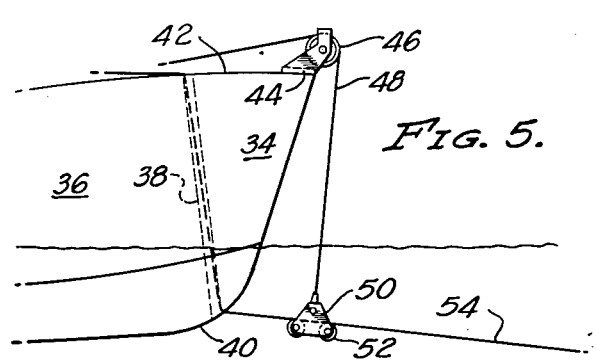
FIG. 5.
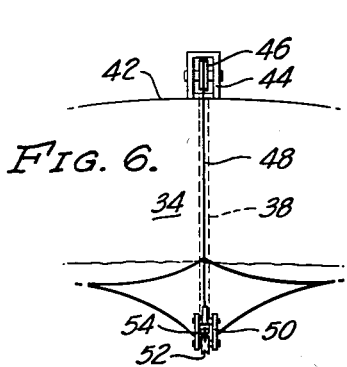
FIG. 6.
INVENTOR.
JAMES O. BILLUPS
BY
ATTORNEY

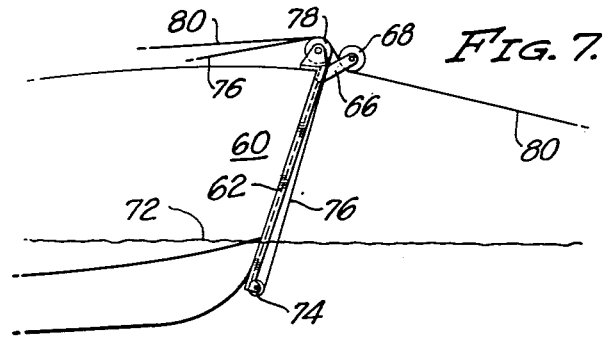
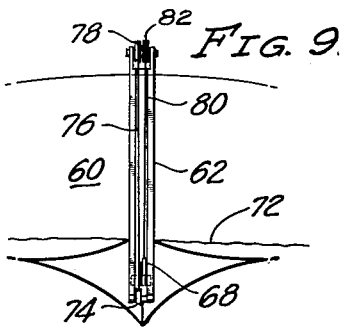
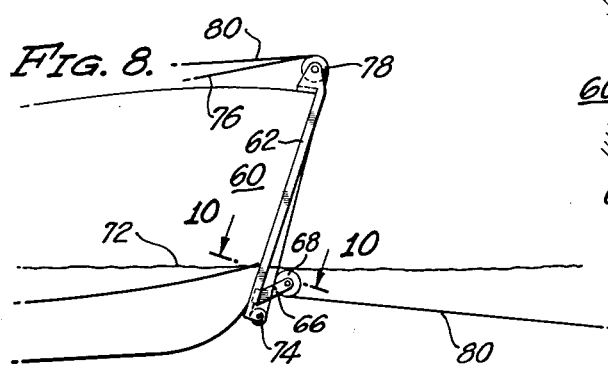
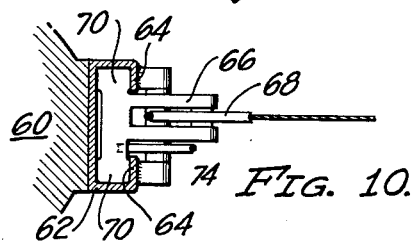
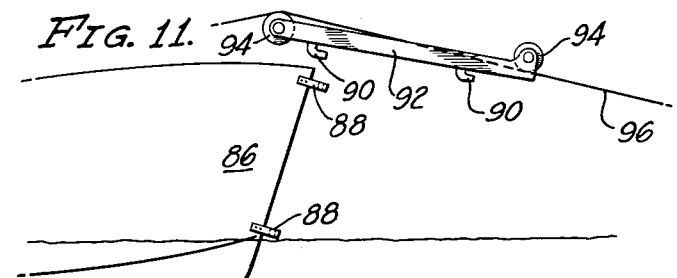
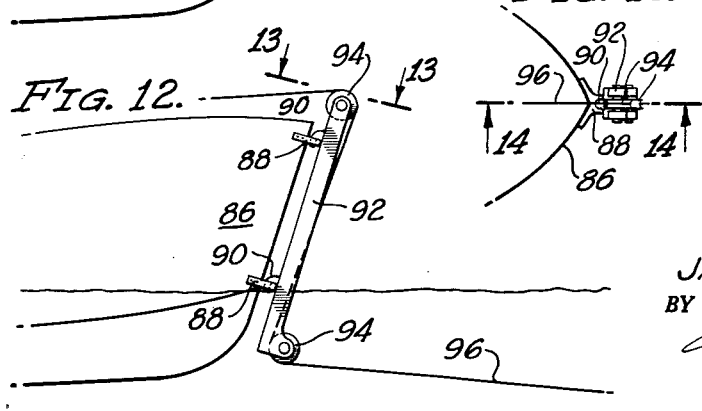
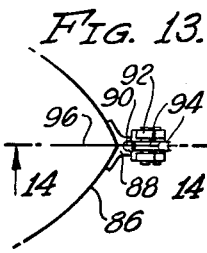
INVENTOR.
JAMES O. BILLUPS
ATTORNEY May 22, 1962  J. O. BILLUPS  3,035,535
ANCHOR LINE POSITIONING DEVICE
Filed Feb. 13, 1959  3 Sheets-Sheet 3

INVENTOR.
JAMES O. BILLUPS
BY
ATTORNEY

United States Patent Office 3,035,535
Patented May 22, 1962

3,035,535
ANCHOR LINE POSITIONING DEVICE
James O. Billups, 1601 Oak Ave., Manhattan Beach, Calif.
Filed Feb. 13, 1959, Ser. No. 793,105
2 Claims. (Cl. 114—.5)

This invention pertains to boat anchor line positioning devices.

The term "anchor line" is used in this specification to designate any type of a rope, chain or cable or combination thereof used to connect an anchor to a boat. With various comparatively small boats such an anchor line is normally a common manila rope. With larger craft such as, for example, an ocean-going freighter it is conventional to use a chain as an anchor line.

When an anchor is used with any common type of boat, the anchor line normally extends from a point on the boat well above the surface of the water into the water at a material distance from the boat itself. Further, such a line extends at an acute angle to the surface of the water. With comparatively small boats such anchor lines normally extend directly from the bow or the stern of the boat while with much larger craft such lines extend from various appropriate types of fittings mounted adjacent to the deck of the boat itself.

When an anchor line extends from a boat as indicated in the preceding paragraph there is a material amount of danger that such a line may be engaged by another boat. Such danger is particularly present during foggy periods, at night and other various equivalent circumstances. Contact of one boat with the anchor line of another boat can lead to a number of undesired consequences. The precise nature of these consequences will depend upon the relative sizes of the boats and the relative size of an anchor line and the anchor attached to it.

In many crowded small boat harbors a comparatively large number of anchor and attached anchor lines are to be found on the bottom of the water. This is evidence of the fact that many common types of anchor lines can be and are severed by contact with propellers and the bows of boats moving through an anchorage. This represents an economic loss. However, it further indicates that the severing of an anchoring line gives rise to a certain amount of danger. When an anchor line is severed a boat is normally cast adrift, and there is danger that such a boat may either be damaged itself or may damage other boats.

Similar damage can occur if an anchor line is contacted by a boat so as to dislodge the anchor attached to such a line. There is always a further amount of danger that a boat engaging an anchor line will itself be damaged by such contact.

The present manner in which anchor lines are used is frequently disadvantageous in certain circumstances. When a boat is anchored using a separate anchor at each of its ends, and is subjected to relatively large waves the necessary movement of the boat over such waves is transmitted to anchors holding the boat itself. With the present conventional use of anchor lines there is some danger of this motion resulting in the anchors attached to these lines being moved from their desired position. Further, the anchor lines tend to result in causing unnecessary motion of the boat itself.

An object of the present invention is to provide anchor line positioning devices. Another object of this invention is to provide anchor line positioning devices which are relatively inexpensive to manufacture, which are convenient to use, and which are very effective for the purpose intended.

A more specific object of the present invention is to provide anchor line positioning devices which are adapted to hold an anchor line with respect to a boat in such a manner that the anchor line, when in use projects from the boat relatively close to, or beneath the surface of the water so as to materially lessen the danger of such an anchor line being engaged by another boat. A further more specific object of this invention is to provide anchor line positioning devices which, when used at both ends of a boat, can be employed in more effectively and desirously anchoring a boat when such a boat is subjected to comparatively large waves.

These and further objects of this invention will be fully apparent to those skilled in the art to which this invention pertains from a detailed consideration of the remainder of this description including the appended claims and the accompanying drawings in which:

FIG. 1 is a side elevational view of an anchor line positioning device of this invention at one stage during the use of this device;

FIG. 2 is a side elevational view showing the device illustrated in FIG. 1 in use;

FIG. 3 is a view taken at line 3—3 of FIG. 2;

FIG. 4 is a side elevational view illustrating a modified anchor line positioning device of this invention at one stage during its use;

FIG. 5 is similar side elevational view illustrating the device shown in FIG. 4 in use in anchoring a boat;

FIG. 6 is a front elevational view of the anchor line positioning device shown in FIG. 5;

FIG. 7 is a side elevational view of a further modified anchor line positioning device of this invention at one stage during the use of this device;

FIG. 8 is a similar side elevational view illustrating the device shown in FIG. 7 in use in anchoring a boat;

FIG. 9 is a front elevational view of the anchor line positioning device shown in FIG. 8;

FIG. 10 is a cross-sectional view taken at line 10—10 of FIG. 8;

FIG. 11 is a side elevational view illustrating the manner in which a still further modified anchor line positioning device of this invention is located in an operative position upon a boat;

FIG. 12 is a side elevational view showing the manner in which the device illustrated in FIG. 11 is used while a boat is anchored;

FIG. 13 is a cross-sectional view taken at line 13—13 of FIG. 12;

FIG. 14 is a cross-sectional view taken at line 14—14 of FIG. 13;

Figure 15:
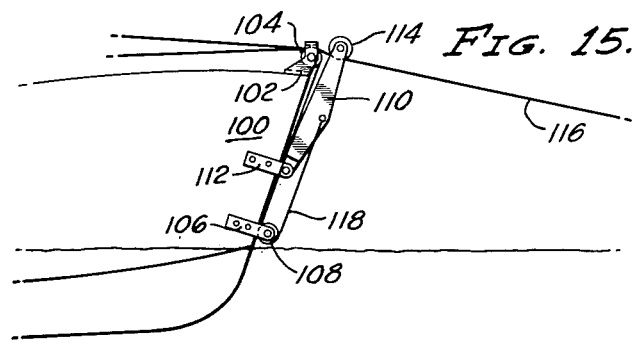
FIG. 15 is a side-elevational view illustrating one stage during the use of another modified anchor line positioning device of this invention.

Wherever convenient for purposes of illustration and explanation like numerals have been used to designate like parts in various figures of the accompanying drawing. Those skilled in the art to which this invention pertains will realize that this invention is not to be considered as being limited by the accompanying drawings. The various anchor line positioning devices illustrated may be modified or altered in accordance with routine, normal engineering skill without changing the manner in which these devices are used. Further, various equivalent means can be employed in order to accomplish the type of action achieved with the anchor line positioning devices of this invention.

As an aid to understanding this invention it can be stated in essentially summary form that all the various anchor line devices to which this invention pertains include means for holding anchor line so that it extends from a boat at about the water level of the boat and so that the anchor line is capable of being manipulated from the upper portion or deck of such a boat. Thus, with the various devices of this invention the anchor line connected to such boat may be moved so as to be held with respect to the boat at about the water line of the boat itself. Further, this invention contemplates the use of two of these devices at opposite ends of a boat so as to achieve an efficient holding action.

This type of construction is best seen in the accompanying drawings. In FIGS. 1, 2 and 3 there is shown the bow 10 of a boat from which there extends a conventional type of anchor line 12, such as a rope, to the end of which away from the bow 10 there is secured an anchor (not shown). This anchor line 12 passes over a pulley 14 rotatably mounted upon a bracket 16 secured to the bow 10. Another pulley 18 is also rotatably secured to this bracket 16. A control line 20 passes over this pulley 18 and then passes around another pulley 22 attached to the bow 10 by a bracket 24 at about the water line. The end of the control line 20 carries a small block 26 upon which there are positioned pulleys 28. The anchor line 12 passes around the pulleys 28 in such a manner that it cannot come loose from the block 26.

In using the anchor line positioning device illustrated in FIGS. 1, 2, and 3 consisting of the parts specifically enumerated in the preceding discussion the anchor line 12 is thrown overboard in the conventional manner. If desired, it may be held in place upon the pulley 14 by means of a small retainer 30. After the anchor line 12 has been thrown overboard, the control line 20 is pulled so as to pull the block 26 to the position shown in FIGS. 2 and 3 of the drawing, placing the anchor line 12 in position where it cannot be readily damaged. Obviously, various conventional cleats or the like are used so as to hold the lines 12 and 20 in the position shown in FIGS. 2 and 3.

In FIGS. 4, 5 and 6 of the drawings there is shown the bow 34 of a boat 36 which is provided with a hollow tube 38 extending from the general area of the keel 40 of the boat 36 to the deck 42 of it. With this modified device a bracket 44 is secured to the bow 34. A pulley 46 is rotatably mounted on the bracket 44; this pulley carries a control line 48 to the end of which there is secured a block 50 rotatably supporting pulleys 52. With this construction an anchor line 54 extends through the tube 38 and through the block 50 so that it cannot become separated from this block.

In using this modified construction when the anchor line 54 is not in use the control line 48 is pulled so that the block 50 is in the position shown in FIG. 4. The anchor line 54 may be thrown overboard when the block 50 is in a position shown in FIG. 4; as the tension upon the control line 48 is released the anchor line 54 will assume the position shown in FIGS. 5 and 6 in which it cannot be readily damaged. In order to retrieve an anchor (not shown) the control line 48 is pulled, placing the anchor line 54 into the position shown in FIG. 4 where it may be handled as required.

In FIGS. 7, 8 and 9 there is shown the bow 60 of a boat which carries a small generally rectangular, vertically disposed track 62 having overhanging shoulders 64. A slider 66 rotatably supporting a single pulley 68 is mounted within the track 62 so that ends 70 of this slider are engaging with the shoulders 64 so as to prevent the slider from being moved away from the bow 60. At an end of the track 62 generally beneath the water line 72 of the bow 60 there is rotatably mounted upon the track 62 another pulley 74 which serves to close this end of the track 62, preventing dislodgment of the slider 66. With this construction a control line 76 is connected to the slider 66 and passes around the pulley 74 and then up thru the track 62 and then over another pulley 78 rotatably mounted on the top of the track 62. Further, with this construction an anchor line 80 is passed over a further pulley 82 rotatably mounted adjacent to the pulley 78 on the track 62 and thence around the pulley 68.

In using the device shown in FIGS. 7, 8, and 9 of the drawings, when the anchor line 80 is first employed and an anchor is thrown overboard the slider 66 is in the position shown in FIG. 7. Next the control line 76 is pulled so as to move the slider 66 adjacent to the pulley 74. This serves to move the anchor line 80 to the position shown in FIGS. 8 and 9 of the drawings where this anchor line may not be readily damaged.

In FIGS. 11, 12 and 13 of the drawings, there is shown the bow 86 of a boat upon which there are mounted two brackets 88, each having holes formed therein. These brackets are adapted to receive hooks 90 formed on a bar 92 so as to rotatably support this bar in a substantially vertical position. Pulleys 94 are rotatably mounted at the ends of the bar 92 in the same plane so as to extend in a vertical direction when the bar 92 is supported on the hooks 90. Further, with this construction an anchor line 96 is passed over the uppermost of the pulleys 94 and is passed under the other of these pulleys. With this construction the bar 92 in use may merely be hooked into place on the brackets 88 so as to mount or hold the anchor line 96 in a position from which it cannot be easily damaged. When it is desired to retrieve an anchor, this bar 92 may be conveniently lifted out of the brackets 88 so as to permit the anchor line 96 to be retrieved in the obvious conventional manner.

Figure 17:
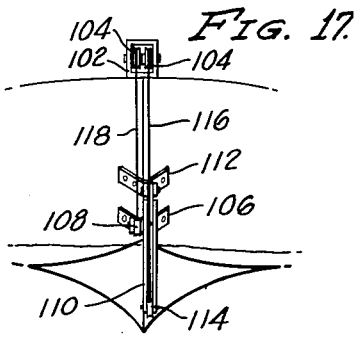
FIG. 17 is a front elevational view of the anchor line positioning device shown in FIG. 16.
Figure 16:
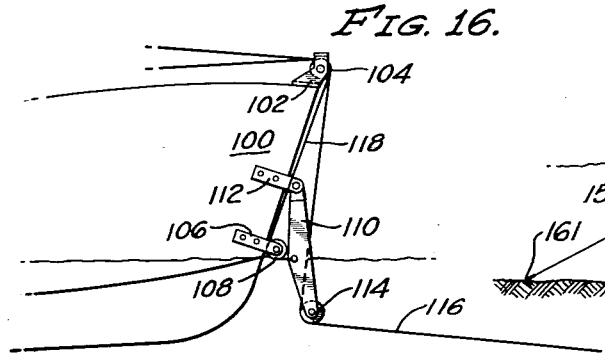
FIG. 16 is a side elevational view illustrating the device shown in FIG. 15 in use.

In FIGS. 15, 16 and 17 of the drawings there is shown the bow 100 of a boat at the top of which there is mounted a bracket 102 holding side by side two small pulleys 104. Another similar bracket 106 holding a single pulley 108 is mounted on the bow 100 adjacent to its lower edge. Between these brackets 102 and 106 an arm 110 is pivotally mounted upon another bracket 112. The end of this arm carries another rotatable pulley 114. With this construction an anchor line 116 passes over one of the pulleys 104 and under the pulley 114 on the arm 110. A control rope or line 118 is attached to the middle of the arm 110 and passes under the pulley 108 and then over the other of the pulleys 104.

In using the construction shown in FIGS. 15, 16 and 17 when there is tension upon the anchor line 116 and no tension upon the control line 118, and this anchor line 116 is used in a conventional manner the arm 110 extends substantially vertically. In order to move this anchor line 116 to a position where it cannot be readily damaged it is only necessary to pull upon the control line 118 so as to rotate the arm 110 to the positioned shown in FIGS. 16 and 17. When it is desired to retrieve an anchor the control line 118 is released and tension is applied to the anchor line 116.

Figure 18:
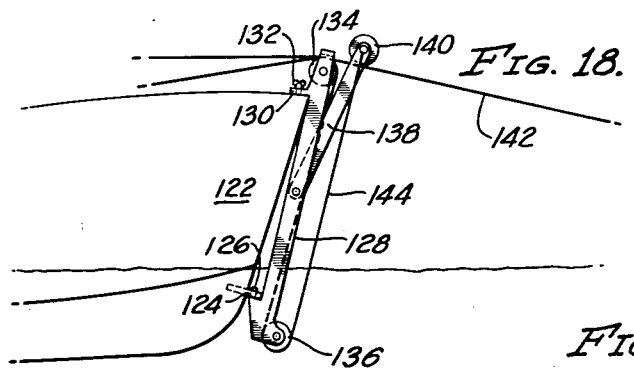
FIG. 18 is a side elevational view of still another modified anchor line positioning device of this invention at one stage during the use of this device.
Figure 20:
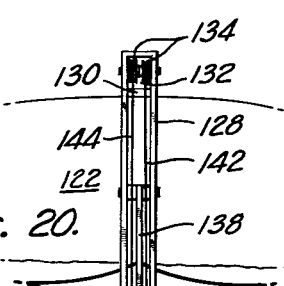
FIG. 20 is a front elevational view of the anchor line positioning device shown in FIG. 19.
Figure 19:
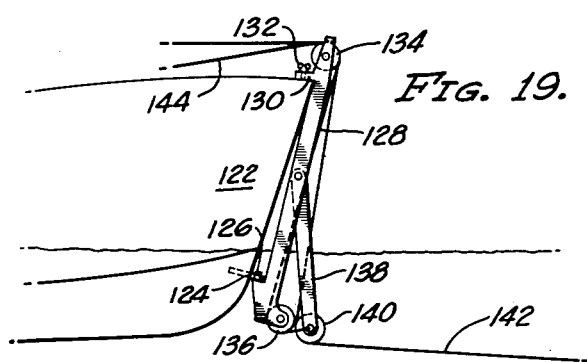
FIG. 19 is a side elevational view showing the device illustrated in FIG. 18 in use.

In FIGS. 18, 19 and 20 of the drawings there is shown the bow 122 of a boat to the lower extremity of which there is attached a bracket 124 having a hole formed therein. This bracket is adapted to receive a hook 126 attached to a bar 128. The end of the bar 128 remote from the hook 126 carries an extension 130 having a hole formed therein. This extension is adapted to be rotatably attached to the bow 122 by means of a bolt 132 passing through the extensions 130 into a corresponding hole (not shown) in the bow 122. At the end of the bar 128 adjacent to the extension 130 there are rotatably mounted upon this bar two pulleys 134; at the other end of the bar 128 there is rotatably mounted a single pulley 136. At the center of the bar 128 there is pivotally mounted an arm 138, to the free end of which there is attached a further pulley 140. An anchor line 142 passes over one of the pulleys 134 and under the pulley 140. Further, a control line 144 is attached to the arm 138 adjacent to the pulley 140 and then passes around the pulley 136 and over one of the pulleys 134.

When the anchor line 142 in the construction shown in FIGS. 18, 19 and 20 is used in a conventional manner and tension is applied to this line, the arm 138 will be rotated to the position shown in FIG. 18. When, however, tension is applied to the control line 144 the arm 138 is rotated to the position shown in FIGS. 19 and 20 of the drawings so as to hold the anchor line 142 in a position generally beneath the surface of the water where it cannot be readily damaged.

The various anchor line positioning devices shown and described in the accompanying drawing and in the preceding discussion may be formed out of a number of corrosive-resistant metals, and, if desired the pulleys used with them may be formed out of inert thermoplastic materials such as nylon and the like. For brevity in the preceding discussion no specific mention has been made of the use of small retainers or the like to permanently hold the various lines and ropes described in position upon the pulleys indicated. Obviously, however, such retaining means may be employed if desired. Further, the various rigid parts such as rods or arms employed in the anchor line positioning devices of this invention may be created from several parallel strips of metal secured together so as to facilitate holding the various lines or ropes indicated in position and with respect to various pulleys as described.

Figure 21:
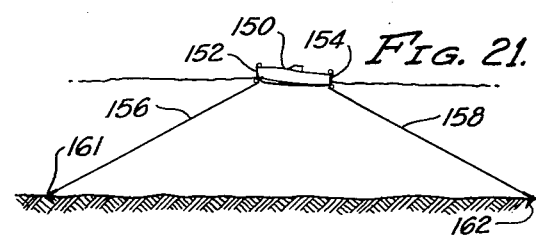
FIG. 21 is a side elevational view showing the manner in which a boat may be securely anchored in place during two anchor line positioning devices of this invention.

Preferably several of these anchor line positioning devices are used with a single boat as indicated in FIG. 21 of the drawings so that one of these devices is at each end of the boat. This type of construction is best seen in FIG. 21 where there is shown in a boat 150 employing a device of this invention 152 at the bow of the boat and another device of this invention 154 at the stern of the boat. With this construction anchor lines 156 and 158 leading to anchors 161 and 162 located at the bottom of the body of water securely hold the boat 150 in place. These anchor lines 156 and 158 are in a location where they cannot be easily damaged by contact with another boat. Further, they hold the boat 150 in place by tension applied to the lower part of the hull of the boat so that as the boat 150 is rocked by contact with relatively high waves, the tendency of the boat to rock and the tendency for this rocking to dislodge the anchors 161 and 162 is effectively minimized.

Because of the nature of this invention it is to be considered as being limited only by the appended claims forming a part of this disclosure.

I claim:
1. In combination, a boat, a bar mounted so as to be capable of rotating about a generally vertical axis on said boat so as to extend vertically from adjacent the upper portion thereof to a point below the water line thereof, a pulley rotatably mounted at each of the ends of said bar, said pulleys being mounted in the same plane, and an anchor line extending from the upper portion of said boat over the upper of said pulleys and under the lower of said pulleys so as to be held so as to extend away from said boat adjacent to the bottom of said boat.

2. In combination a boat, brackets mounted on said boat above one another, said brackets having vertically extending holes formed therein, a bar having hooks formed thereon, said hooks being located within said holes in said brackets so as to permit said bar to rotate about a generally vertical axis, and serving to support said bar so that said bar is capable of being rotated about a vertical axis, one end of said bar being located below the water line a pulley rotatably mounted at each of the ends of said bar, said pulleys being located in the same plane, and an anchor line extending from the upper portion of said boat over the upper of said pulleys and under the lower of said pulleys so as to be held so as to extend away from said boat adjacent to the bottom of said boat.

References Cited in the file of this patent

UNITED STATES PATENTS

| 808,942 | Neumaier | Jan. 2, 1906 |
| 895,648 | Laubeuf | Aug. 11, 1908 |
| 1,061,642 | Stoup | May 13, 1913 |
| 1,613,374 | Bedgood | Jan. 4, 1927 |

FOREIGN PATENTS

| 4,533 | Great Britain | 1882 |
| 495,154 | Great Britain | Nov. 8, 1938 |